United States Patent
Chen (10) Patent No.: US 11,239,646 B1
(45) Date of Patent: Feb. 1, 2022

(54) CABLE MANAGEMENT STRUCTURE APPLIED IN TABLE

(71) Applicant: TIMOTION TECHNOLOGY CO., LTD., New Taipei (TW)

(72) Inventor: Hung-Wei Chen, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/157,679

(22) Filed: Jan. 25, 2021

(30) Foreign Application Priority Data

Dec. 21, 2020 (TW) ................................ 109216881

(51) Int. Cl.
- *A47B 9/10* (2006.01)
- *H02G 11/00* (2006.01)
- *H02G 3/04* (2006.01)
- *A47B 9/00* (2006.01)

(52) U.S. Cl.
CPC ............. *H02G 11/006* (2013.01); *A47B 9/00* (2013.01); *H02G 3/0437* (2013.01); *A47B 2200/0057* (2013.01); *A47B 2200/0058* (2013.01)

(58) Field of Classification Search
CPC ................................. H02G 11/006; A47B 9/10
USPC ........................................................ 108/147
See application file for complete search history.

(56) References Cited

U.S. PATENT DOCUMENTS

| | | | | |
|---|---|---|---|---|
| 3,814,414 A | * | 6/1974 | Chapa | A61F 5/3784 5/601 |
| 4,315,466 A | * | 2/1982 | Boerigter | A47B 9/12 108/147 |
| 4,949,650 A | * | 8/1990 | Allard | A47B 9/18 108/146 |
| 5,311,827 A | * | 5/1994 | Greene | A47B 9/02 108/147 |
| 6,378,446 B1 | * | 4/2002 | Long | A47B 9/02 108/147 |
| 7,412,931 B2 | * | 8/2008 | Seidl | A47B 9/02 108/147 |
| 9,038,549 B1 | * | 5/2015 | Zebarjad | A47B 9/02 108/147 |
| 9,504,315 B2 | * | 11/2016 | Hansen | A47B 9/10 |
| 10,455,932 B2 | * | 10/2019 | Lin | A47B 9/00 |
| 11,160,365 B2 | * | 11/2021 | Tao | A47B 9/12 |

(Continued)

Primary Examiner — William H. Mayo, III
Assistant Examiner — Krystal Robinson
(74) Attorney, Agent, or Firm — Chun-Ming Shih; HDLS IPR SERVICES (57) ABSTRACT

A cable management structure applied in a table is disclosed. A revolving column has a first end and a second end. A pair of revolving rollers are disposed in the revolving column and includes a first revolving roller and a second revolving roller arranged spacedly. A pair of supporting columns include a first supporting column forming a first sleeve segment and a second supporting column forming a second sleeve segment. A pair of adjusting rollers include a first and a second adjusting roller disposed in the first sleeve segment and in the second sleeve segment. A cable penetrates the first supporting column and passes around the first adjusting roller, and revolves to the first revolving roller, and passes around the first revolving roller and passes around the second adjusting roller, and revolves to the second revolving roller so as to turn and penetrate into the second supporting column.

10 Claims, 6 Drawing Sheets

(56) References Cited

U.S. PATENT DOCUMENTS

| | | | |
|---|---|---|---|
| 2012/0227642 A1* | 9/2012 | Sekikawa | A47B 9/10 108/147 |
| 2015/0320198 A1* | 11/2015 | Zebarjad | A47B 9/20 108/147 |
| 2016/0037907 A1* | 2/2016 | Ergun | A47B 9/02 108/147 |

* cited by examiner

CABLE MANAGEMENT STRUCTURE APPLIED IN TABLE

BACKGROUND OF THE DISCLOSURE

Field of the Disclosure

This disclosure relates to a cable management structure, especially to a cable management structure applied in a table.

Description of Related Art

A table, for example a reading table, an office table, or a meeting table, is must-have furniture in our daily lives. With the development of technology, the table is provided with more functions, for example an electric table capable of being automatically adjusted its height, so that the electric table is commonly accepted by consumers.

Moreover, a motor is adopted in the electric table for driving a lifting device for achieving an objective of automatically adjusting the height of the electric table. When the motor is operated, electric power required by the motor is obtained through being connected to the public power via a cable. However, the cable of the electric table is often exposed out of a table body of the electric table, thereby affecting the whole appearance of the electric table. Moreover, when the table is in use or the location of the table is displaced, the cable exposed out of the table body may be pulled, so that the cable may be damaged or the table cannot be normally operated.

Accordingly, the applicant of this disclosure has devoted himself for improving the mentioned disadvantages.

SUMMARY OF THE DISCLOSURE

This disclosure is to provide a cable management structure applied in a table. A cable is stored in a revolving column and supporting columns, which are mutually sleeve, for achieving a cable management function, so that the cable may be prevented from being exposed out of the table, thereby prettifying the whole appearance of the table.

This disclosure is to provide a cable management structure applied in a table. The cable management structure is able to process a cable management operation to a table having a table plate with different lengths, thereby increasing the practicability of this disclosure.

Accordingly, this disclosure provides a cable management structure applied in a table, which is used for managing a cable disposed in a table, and includes a revolving column, a pair of revolving rollers, a pair of supporting columns and a pair of adjusting rollers. The revolving column has a revolving space and a first end and a second end arranged on opposite sides of the revolving space. The pair of revolving rollers includes a first revolving roller and a second revolving roller disposed spacedly in the revolving space. The pair of supporting columns include a first supporting column and a second supporting column, the first supporting column is sleeved on the first end of the revolving column for forming a first sleeve segment, and the second supporting column is sleeved on the second end of the revolving column for forming a second sleeve segment. The pair of adjusting rollers include a first adjusting roller and a second adjusting roller disposed spacedly between the pair of revolving rollers, the first adjusting roller is disposed in the first sleeve segment and close to the first revolving roller, and the second adjusting roller is disposed in the second sleeve segment and close to the second revolving roller. The cable penetrates into the first supporting column and forwardly extends to the first adjusting roller, and revolves to the first revolving roller, and the cable passes around the first revolving roller and turns and extends to the second revolving roller, and revolves to the second adjusting roller, and passes around the second adjusting roller and turns and extend to penetrate into the second supporting column.

In comparison with related art, this disclosure has advantageous features as below. According to the cable management structure applied in the table provided by this disclosure, the pair of supporting columns are sleeved on opposite sides of the revolving column, the pair of revolving rollers and the pair of adjusting rollers are disposed spacedly in the revolving column, so that the cable penetrates into the first supporting column and forwardly extends to the first adjusting roller, and passes around the first adjusting roller and revolves to the first revolving roller, and the cable turns and extends to the second adjusting roller, and revolves to the second revolving roller, and finally passes around the second revolving roller and turns and extends to penetrate into the second supporting column. Accordingly, the cable may be stored in the revolving column and the supporting columns, which are mutually sleeved, for achieving a cable management function, and the cable may be managed in the table having the table plate with different lengths for being prevented from being exposed out of the table, thereby prettifying the whole appearance and increasing the practicability of the table.

DETAILED DESCRIPTION OF THE DISCLOSURE

An embodiment of this disclosure is described with reference to the drawings.

Figure 1:
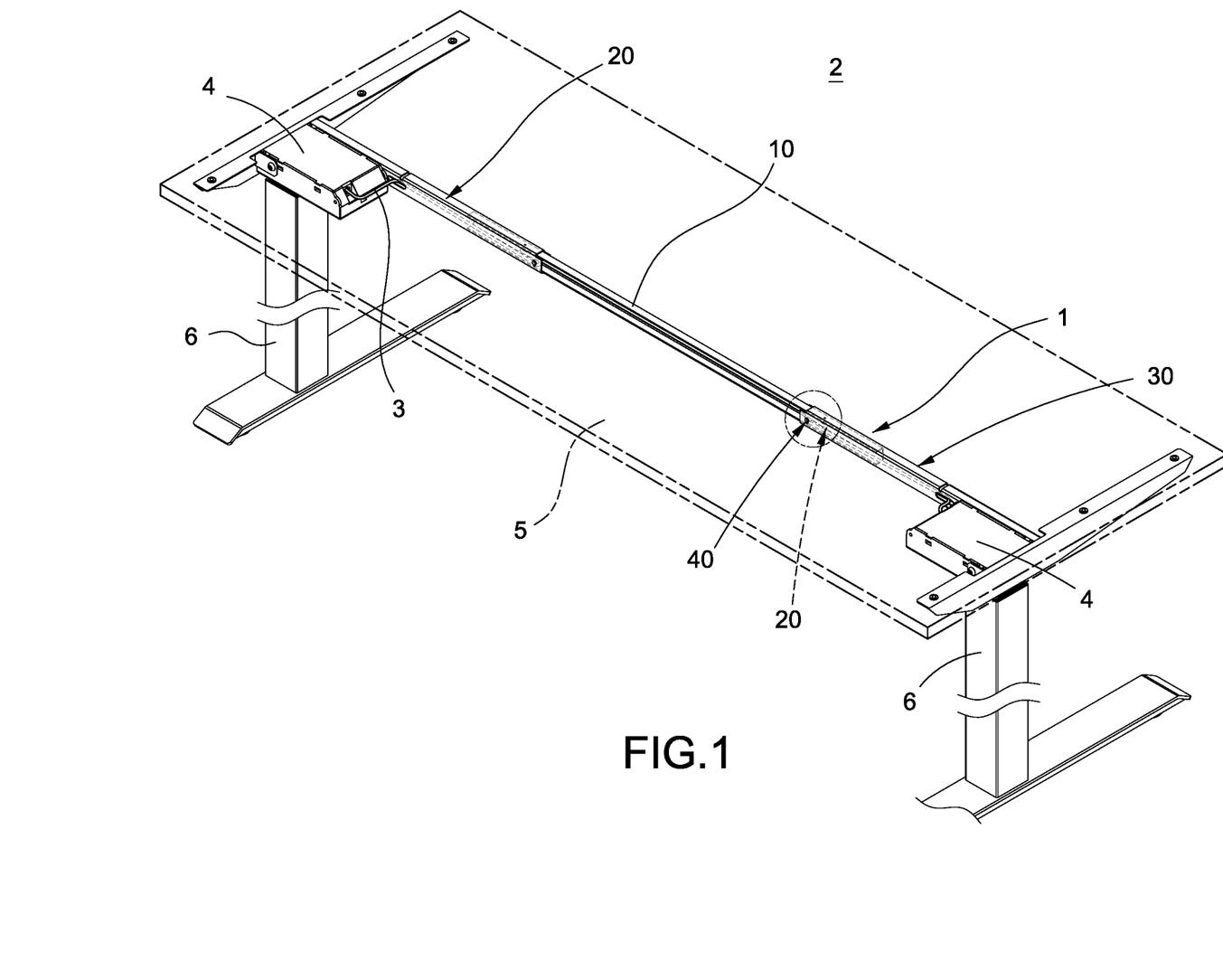
FIG. 1 is a perspective view showing the appearance of the cable management structure applied in the table according to this disclosure.
Figure 2:
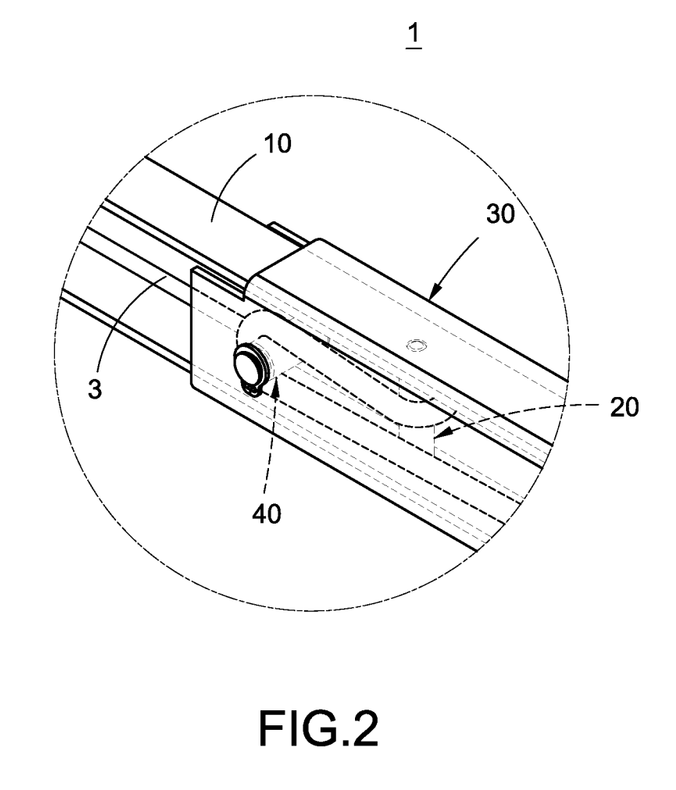
FIG. 2 is a partially enlarged view showing the cable management structure applied in the table according to this disclosure.

Please refer to FIG. 1 and FIG. 2. FIG. 1 is a perspective view showing the appearance of the cable management structure applied in the table according to this disclosure and FIG. 2 is a partially enlarged view showing the cable management structure applied in the table according to this disclosure. This disclosure provides a cable management structure 1 applied in a table, which is used for managing a cable 3 disposed on a table 2, and includes a revolving column 10, a pair of revolving rollers 20, a pair of supporting columns 30 and a pair of adjusting rollers 40. The pair of supporting columns 30 are sleeved on opposite sides of the revolving column 10. The pair of revolving rollers 20 and the pair of adjusting rollers 40 are arranged spacedly in the revolving column 10 and the pair of supporting columns 30, and used for the cable 3 to pass through so as to provide a management function to the cable 3.

According to one embodiment of this disclosure, the table 2 is an electric table and has a pair of table supporters 6. The pair of table supporters 6 are fixed on one side of the pair of supporting columns 30. Moreover, the table 2 further has a table plate 5, and the pair of table supporters 6 support the table plate 5. The revolving column 10 and the pair of supporting columns 30 are fixed on a bottom surface of the table plate 5 and arranged between the pair of table supporters 6. In some embodiments, the pair of table supporters 6 have a motor case 4 respectively, and a lifting mechanism (not shown in figures) disposed in the table supporter 6. The table supporter 6 drives the lifting mechanism through the motor case 4 to drive the table supporter 6 to be ascended or descended, so that a height of the table plate 5 may be adjusted. Details of the cable management structure 1 are provided as below.

Figure 3:
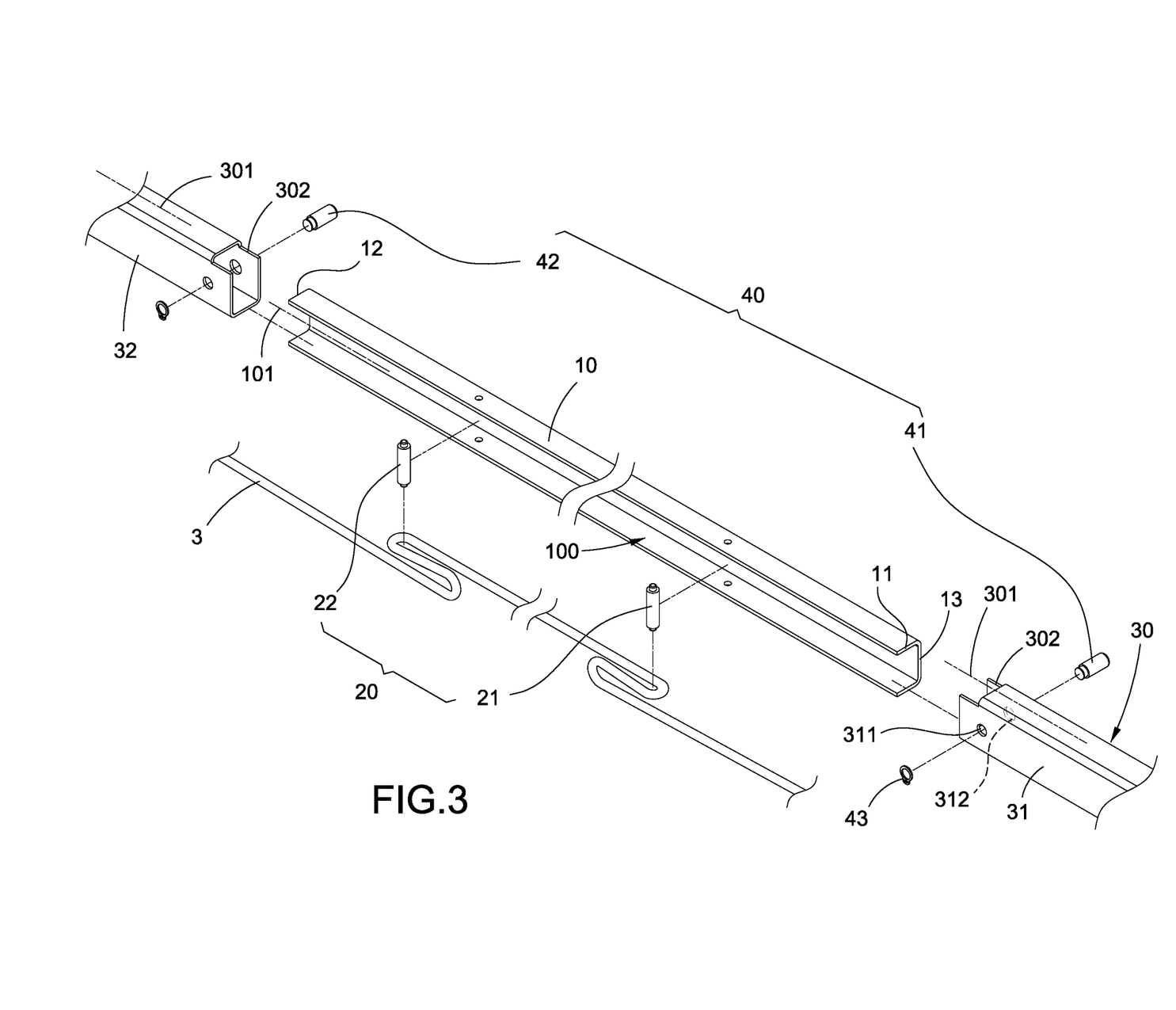
FIG. 3 is a perspective exploded view showing the cable management structure applied in the table according to this disclosure.
Figure 4:
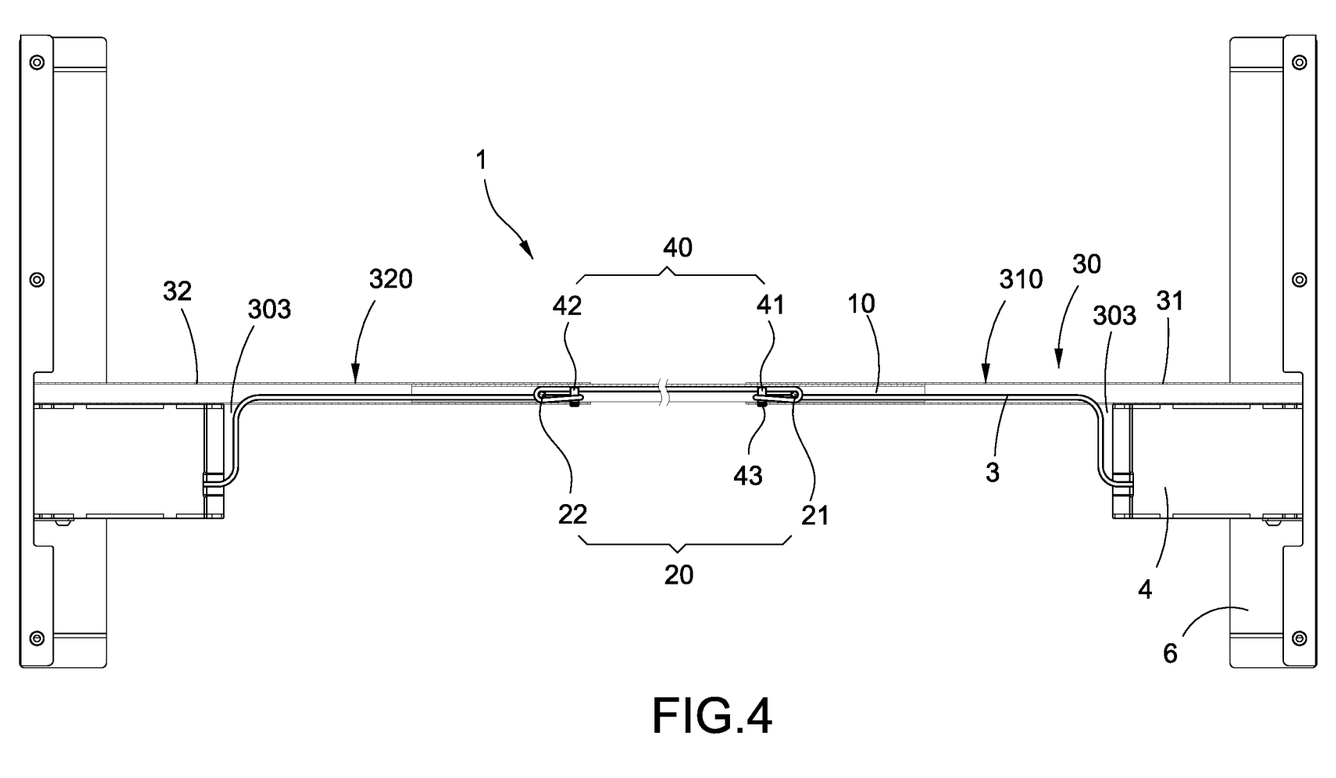
FIG. 4 is a cross sectional view showing the assembly of the cable management structure applied in the table according to this disclosure.

Please refer to FIG. 3 and FIG. 4. FIG. 3 is a perspective exploded view showing the cable management structure applied in the table according to this disclosure and FIG. 4 is a cross sectional view showing the assembly of the cable management structure applied in the table according to this disclosure. As show in FIG. 3, specifically, the revolving column 10 is a hollow structure, and has a revolving space 100, a first end 11 and a second end 12 arranged on opposite sides of the revolving space 100. Moreover, the pair of revolving rollers 20 have a first revolving roller 21 and a second revolving roller 22 disposed spacedly in the revolving space 100.

Details are provided as below. The revolving column 10 has a first extending direction 101. The pair of revolving rollers 20 are longitudinally connected with the revolving column 10 in a manner of a rotation shaft thereof being perpendicular to the first extending direction 101. According to this embodiment, a cross section of the revolving column 10 is in a U-like shape, and the rotation shaft of each of the revolving rollers 20 is disposed on two opposite surfaces of the revolving column 10.

The pair of supporting columns 30 have a first supporting column 31 and a second supporting column 32. The first supporting column 31 is sleeved on the first end 11 of the revolving column 10 for forming a first sleeve segment 310. The second supporting column 32 is sleeved on the second end 12 of the revolving column 10 for forming a second sleeve segment 320. What shall be addressed is that the entire length of the pair of supporting columns 30 relative to the revolving column 10 may be adjusted through adjusting a mutual sleeved distance.

The pair of adjusting rollers 40 have a first adjusting roller 41 and a second adjusting roller 42 disposed spacedly between the pair of revolving rollers 20. The first adjusting roller 41 is disposed in the first sleeve segment 310 and close to the first revolving roller 21, and the second adjusting roller 42 is disposed in the second sleeve segment 320 and close to the second revolving roller 22.

Figure 5:
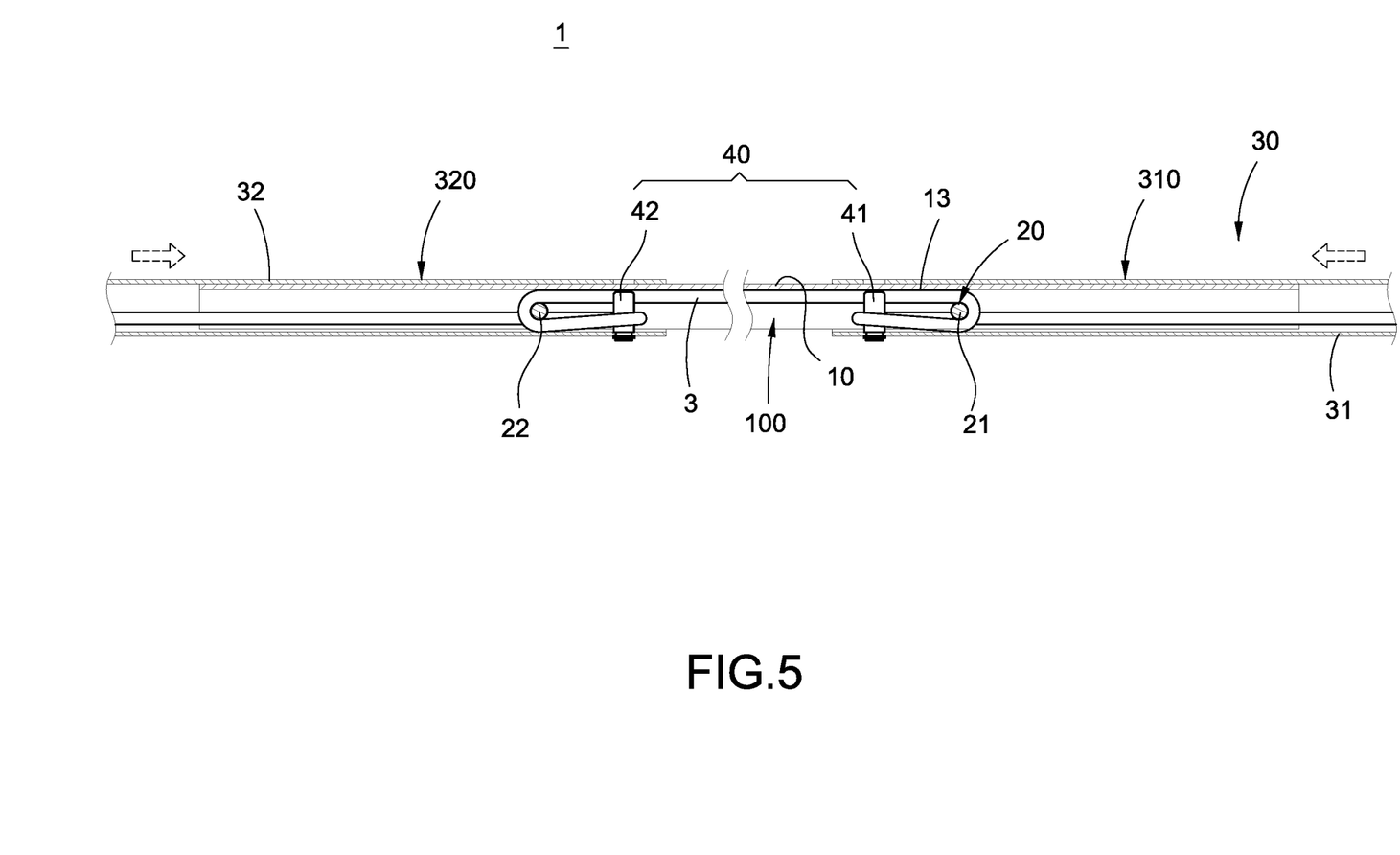
FIG. 5 is a schematic view showing a length adjusting operation of the cable management structure applied in the table according to this disclosure.

In some embodiments, each of the supporting columns 30 is a hollow rectangular pipe, and each of the supporting columns 30 has a second extending direction 301. The pair of adjusting rollers 40 are transversally connected with each of the supporting columns 30 in a manner of a rotation shaft thereof being perpendicular to the second extending direction 301. Moreover, one end of the rotation shaft of each adjusting roller 40 is disposed on a side surface of the supporting column 30, and another end thereof is suspended and arranged adjacent to an inner wall surface of the revolving column 10 (as shown in FIG. 5).

According to this embodiment, each of the adjusting rollers 40 further has a buckle ring 43, and the buckle ring 43 is connected on an outer surface of the rotation shaft of the adjusting roller 40 which protrudes from the supporting column 30.

What shall be addressed is that each of the supporting columns 30 has an opened slot 302 (as shown in FIG. 3) disposed on the end sleeved with the revolving column 10. The arrangement of the opened slot 302 allows the revolving column 10 to be more easily inserted in the supporting column 30. Moreover, a cable slot 303 is disposed on another side of the supporting column 30 away from the opened slot 302 (as shown in FIG. 4) for the capable 3 to penetrate. According to this embodiment, one end of the cable 3 is connected to the motor case 4, and another end thereof penetrates into the cable slot 303.

As shown in FIG. 4, according to one embodiment of this disclosure, the cable 3 penetrates into the first supporting column 31 and extends to the first adjusting roller 41, and passes around the first adjusting roller 41 and revolves to the first revolving roller 21. The cable 3 further passes around the first revolving roller 21 and turns and extends to the second revolving roller 22, and passes around the second revolving roller 22 and revolves to the second adjusting roller 42, and finally passes around the second adjusting roller 42 and turns and extends to penetrate into the second supporting column 32.

What shall be addressed is that, according to this embodiment, one end of each of the adjusting rollers 40 is disposed in a penetrated hole formed on one side of the supporting column 30, and another end thereof passes a penetrated hole formed on another side, and a gap relative to an inner wall surface of another side is reserved. As shown in FIG. 3, taking the first adjusting roller 41 being disposed in the first supporting column 31 as an example, one end of the first adjusting roller 41 passes a second penetrated hole 312 of the first supporting column 31, and passes a first penetrated hole 311 on another side so as to be fixed on the first supporting column 31 via the buckle ring 43, and a gap (as shown in FIG. 5) is reserved between the another end of the first adjusting roller 41 and an inner wall surface of the first supporting column 31. As such, after the revolving column 10 penetrates into the first supporting column 31, a side surface 13 of the revolving column 10 is disposed between the first supporting column 31 and the first adjusting roller 41. Accordingly, the first supporting column 31 may retractably move in the gap relative to the revolving column 10, thereby allowing the entire length of the first supporting column 31 and the revolving column 10 after being sleeved to be adjusted.

Figure 6:
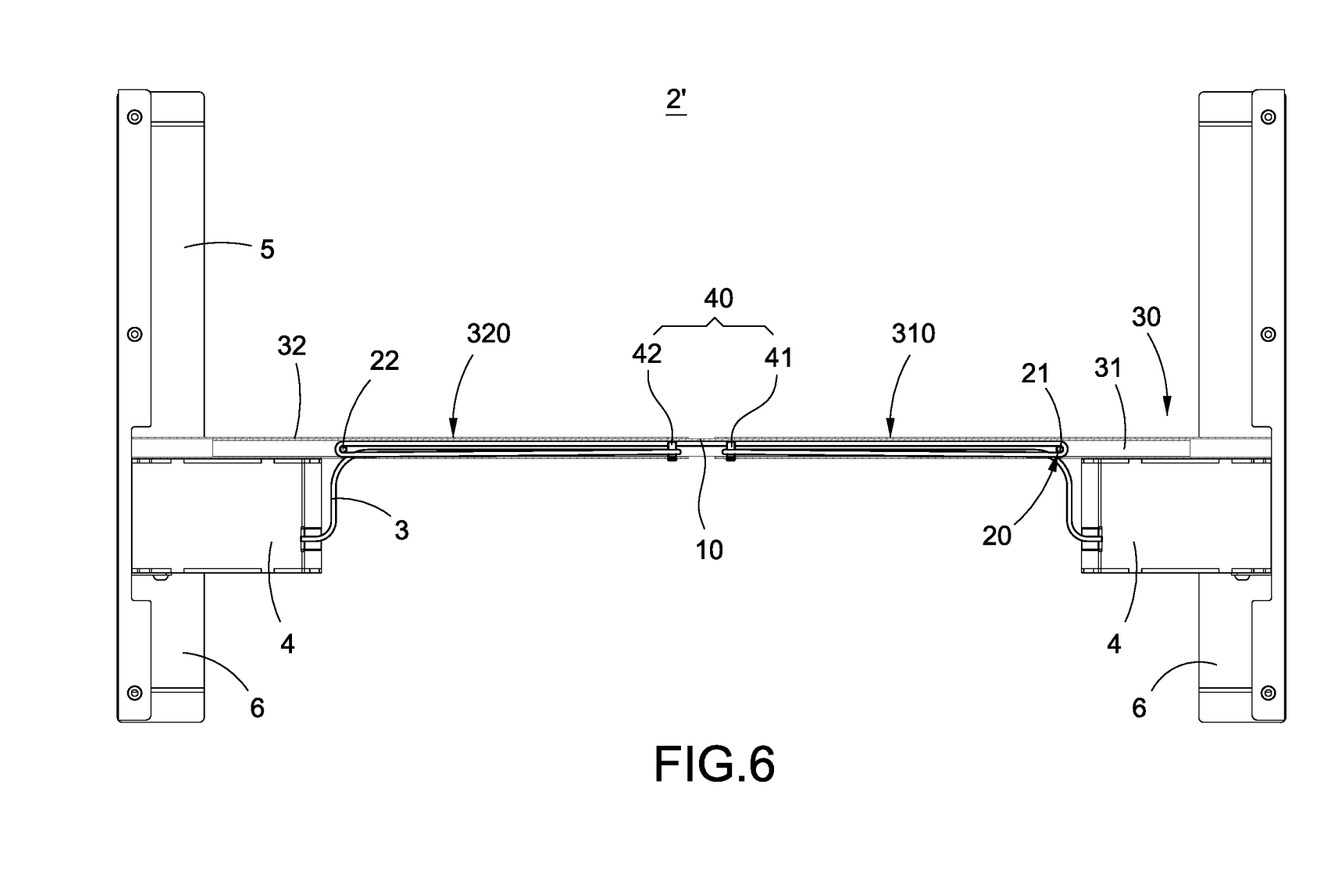
FIG. 6 is a cross sectional view showing the cable management structure applied in the table wherein the length adjusting operation being finished according to this disclosure.

Please refer to FIG. 5 and FIG. 6. FIG. 5 is a schematic view showing a length adjusting operation of the cable management structure applied in the table according to this disclosure and FIG. 6 is a cross sectional view showing the cable management structure applied in the table wherein the length adjusting operation being finished according to this disclosure. What shall be addressed is that the cable management structure of this disclosure may process a cable management operation with respect to the table having the table plate with different lengths. As shown in FIG. 6, the cable management structure 1 applied to the table may manage a cable 3 disposed in another table 2'. According to this embodiment, the table 2' has a smaller table plate (not shown in figures), so that the entire length may be adjusted through the distance of the pair of supporting columns 30 being mutually and correspondingly sleeved with the revolving column 10.

As shown in FIG. 5, when in use, an external force is applied to the first supporting column 31 and the second supporting column 32 for enabling the first supporting column 31 and the second supporting column 32 to move towards such directions that the first supporting column 31 and the second supporting column 32 are close to each other, at this moment, a length of the first supporting column 31 sleeved on the first sleeve segment 310 of the revolving column 10 and a length of the second supporting column 32 sleeved on the second sleeve segment 320 of the revolving column 10 are increased, so that the entire length of the revolving column 10 and the pair of supporting columns 30 may be shortened.

As shown in FIG. 6, locations of the pair of adjusting rollers 40 are changed with respect to the pair of supporting columns 30 being sleeved with the revolving column 10. As such, when the length of the first sleeve segment 310 and the length of the second sleeve segment 320 are increased, the first adjusting roller 41 and the second adjusting roller 42 move towards a direction being close to each other. According to this embodiment, the first supporting roller 41 and the second supporting roller 42 move from locations of being close to the first revolving roller 21 and the second revolving roller 22, as shown in FIG. 5, towards locations of being close to each other, as shown in FIG. 6, thereby shortening the entire width of the table 2'.

What shall be addressed is that, at this moment the cable 3 passes around the first revolving roller 21 and the first adjusting roller 41, and the length between the second revolving roller 22 and the second adjusting roller 42 is increased. Moreover, compared to the previous embodiment, the cable 3 may be applied in the table having a shorter length under a situation of the entire length of the cable 3 being remained according to this embodiment, thereby achieving an object of managing the cable in the table.

Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of the disclosure as defined in the appended claims.

What is claimed is:

1. A cable management structure applied in a table, used for managing a cable disposed in the table, and the cable management structure comprising:
   a revolving column, comprising a revolving space and a first end and a second end arranged on opposite sides of the revolving space;
   a pair of revolving rollers, comprising a first revolving roller and a second revolving roller disposed spacedly in the revolving space;
   a pair of supporting columns, comprising a first supporting column and a second supporting column, wherein a first sleeve segment is configured in a manner of the first supporting column being sleeved on the first end of the revolving column, and a second sleeve segment is configured in a manner of the second supporting column being sleeved on the second end of the revolving column; and
   a pair of adjusting rollers, comprising a first adjusting roller and a second adjusting roller disposed spacedly between the pair of revolving rollers, wherein the first adjusting roller is disposed in the first sleeve segment and close to the first revolving roller, and the second adjusting roller is disposed in the second sleeve segment and close to the second revolving roller;
   wherein, the cable penetrates into the first supporting column and forwardly extends to the first adjusting roller, and revolves to the first revolving roller, and the cable passes around the first revolving roller and turns and extends to the second revolving roller, and revolves to the second adjusting roller, and the cable passes around the second adjusting roller and turns and extends to penetrate into the second supporting column.

2. The cable management structure applied in the table according to claim 1, wherein the revolving column comprises a first extending direction, and the pair of revolving rollers are longitudinally connected with the revolving column in a manner of a rotation shaft thereof being perpendicular to the first extending direction.

3. The cable management structure applied in the table according to claim 2, wherein each of the supporting columns comprises a second extending direction, and the pair of adjusting rollers are transversally connected with the supporting column in a manner of a rotation shaft thereof being perpendicular to the second extending direction.

4. The cable management structure applied in the table according to claim 2, wherein a cross section of the revolving column is in a U-like shape, and the rotation shaft of each of the revolving rollers is disposed on two opposite surfaces of the revolving column.

5. The cable management structure applied in the table according to claim 3, wherein the supporting column comprises a hollow rectangular pipe, one end of the rotation shaft of each of the adjusting rollers is disposed on a side surface of the supporting column, and another end thereof is arranged adjacent to an inner wall surface of the revolving column.

6. The cable management structure applied in the table according to claim 5, wherein each of the adjusting rollers further comprises a buckle ring connected on an outer surface of the rotation shaft of the adjusting roller protruding from the supporting column.

7. The cable management structure applied in the table according to claim 5, wherein each of the supporting columns comprises an opened slot disposed on the end sleeved with the revolving column, and a cable slot disposed on another side thereof away from the opened slot to be penetrated by the capable.

8. The cable management structure applied in the table according to claim 7, wherein the table comprises an electric table and a pair of table supporters, the pair of table supporters comprises a motor case respectively, and the pair of table supporters are fixed on one side of the pair of supporting columns, one end of the cable is connected to the motor case, and another end thereof penetrates into the cable slot.

9. The cable management structure applied in the table according to claim 1, wherein the table comprises a table plate and a pair of table supporters supporting the table plate, the revolving column and the pair of supporting columns are fixed on a bottom surface of the table plate and arranged between the pair of table supporters.

10. The cable management structure applied in the table according to claim 9, wherein the table comprises an electric lifting table and a pair of lifting mechanisms, and the pair of lifting mechanisms are disposed in the pair of table supporters.

\* \* \* \* \*